US00RE40505E

(19) United States
(12) Reissued Patent
Murphy

(10) Patent Number: US RE40,505 E
(45) Date of Reissued Patent: Sep. 16, 2008

(54) APPARATUS FOR CUTTING RUMBLE STRIPS IN A ROAD SURFACE

(75) Inventor: Tim L. Murphy, Eldorado, KS (US)

(73) Assignee: Dustrol, Inc., Towanda, KS (US)

(21) Appl. No.: 11/108,106

(22) Filed: Apr. 15, 2005

Related U.S. Patent Documents

Reissue of:
(64) Patent No.: 6,547,484
Issued: Apr. 15, 2003
Appl. No.: 10/120,010
Filed: Apr. 10, 2002

U.S. Applications:
(63) Continuation-in-part of application No. 09/783,418, filed on Feb. 14, 2001, now Pat. No. 6,454,490.
(60) Provisional application No. 60/333,897, filed on Nov. 28, 2001.

(51) Int. Cl.
*E01C 23/16* (2006.01)

(52) U.S. Cl. ..... 404/124; 404/93; 404/122; 299/39.6

(58) Field of Classification Search ..... 299/76, 299/78, 39.1, 39.2, 39.4, 39.6–39.8, 79.1, 299/40.1; 404/90, 92–94, 96, 122, 124
See application file for complete search history.

(56) References Cited

U.S. PATENT DOCUMENTS

| | | | |
|---|---|---|---|
| 2,826,128 | A | 3/1958 | Summers |
| 3,516,712 | A | 6/1970 | Bennett et al. |
| 3,529,517 | A | 9/1970 | Liddle |
| 4,463,989 | A | 8/1984 | Kennedy |
| 4,701,069 | A | 10/1987 | Whitney |
| 5,391,017 | A | 2/1995 | Thomas et al. |
| 5,456,547 | A | 10/1995 | Thomas et al. |
| 5,553,926 | A | 9/1996 | Blackstock et al. |
| 5,582,468 | A | 12/1996 | Latham |
| 5,582,490 | A | 12/1996 | Murray |
| 5,607,255 | A | 3/1997 | Thomas et al. |
| 5,676,490 | A | 10/1997 | Nelson |
| 5,860,764 | A | 1/1999 | Roberts |
| 6,210,071 | B1 | 4/2001 | McSharry |
| 6,220,783 | B1 | 4/2001 | Maxwell |
| 6,402,252 | B1 | 6/2002 | Dickson |

FOREIGN PATENT DOCUMENTS

| | | | |
|---|---|---|---|
| EP | 245810 | A2 | 11/1987 |
| GB | 2238562 | A | 6/1991 |

OTHER PUBLICATIONS

William Schafer, NexGen Highwall Mining Systems, LLC, US; The Evolution of Highwall Mining, date unknown.

*Primary Examiner*—Gary S. Hartmann
*Assistant Examiner*—Alexandra Pechhold
(74) *Attorney, Agent, or Firm*—Hovey Williams LLP

(57) ABSTRACT

A cutting head is provided for milling rumble strip depressions in a road surface. The cutting head has a center rotational axis and a transverse diameter that varies along the length of the rotational axis so that an outer cutting surface of the cutting head defines a plane curve, such as an ellipsoid with truncated ends. The cutting head is mounted on a milling machine and rotated about the rotational axis as it is moved alternately up and down into the road surface. As the milling machine moves down the road, the movement of the cutting head creates spaced apart rumble strip depressions in the road. Because of the elliptical configuration of the cutting head cutting surface, the dimensions of the depressions can be varied along both the forward and lateral axes by simply varying the depth of cut. The curved profile of the cutting head along the rotational axis creates rumble strip depressions that avoid the sharp ninety degree corners and vertical side walls found in conventional rumble strips.

39 Claims, 3 Drawing Sheets

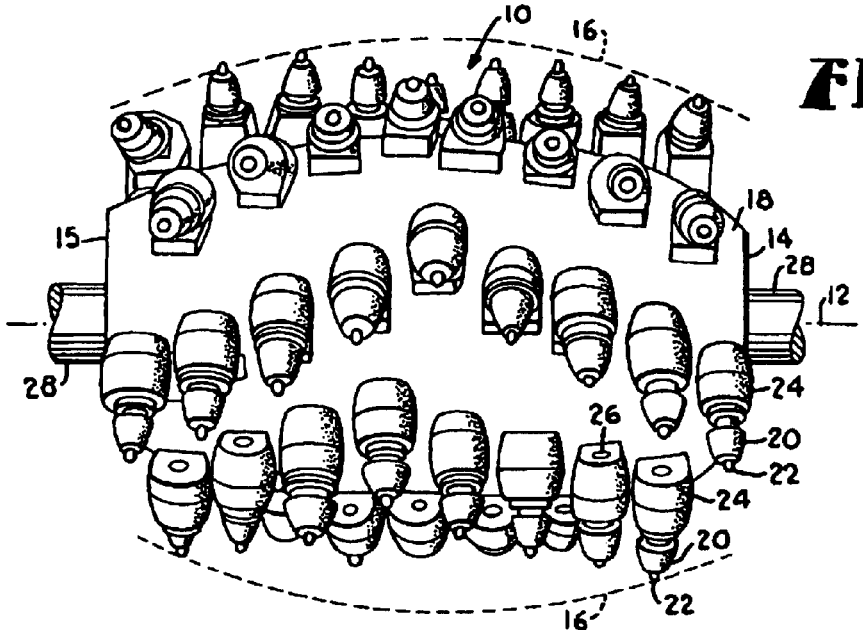
FIG. 1.
FIG. 2.
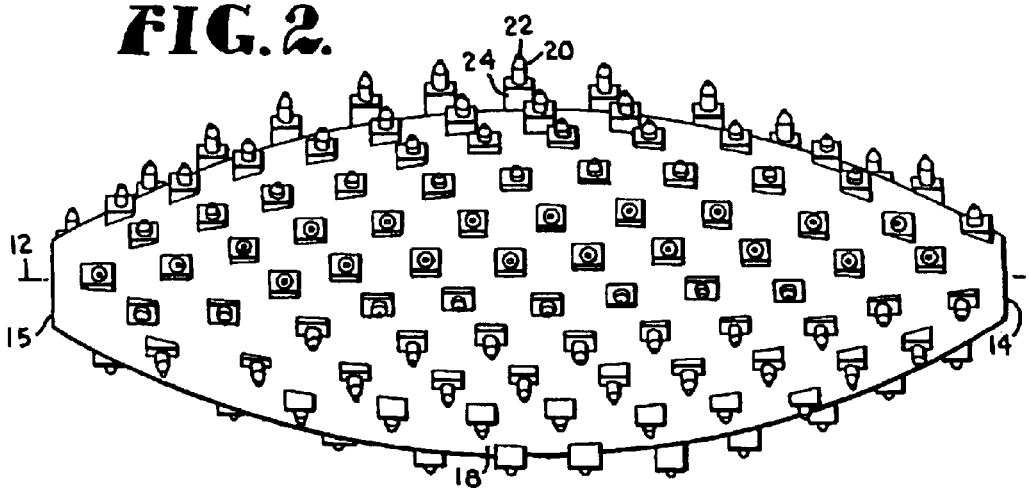
FIG. 8.
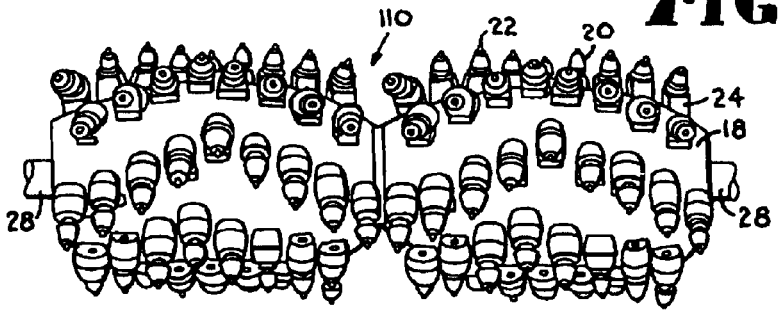

FIG. 5.
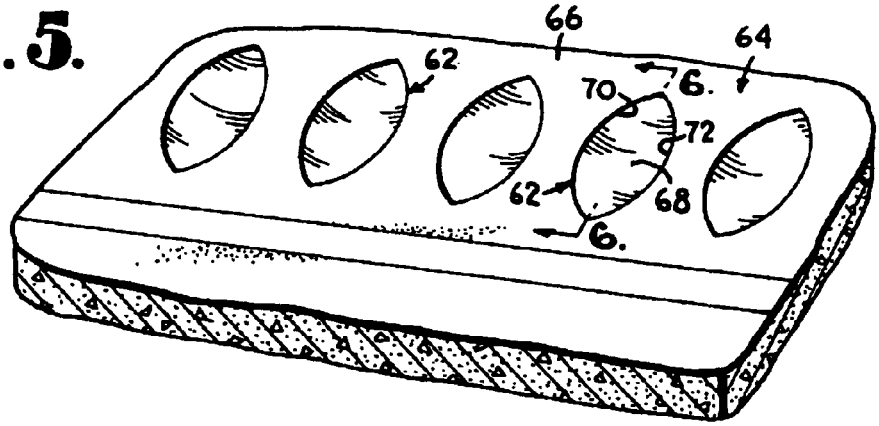
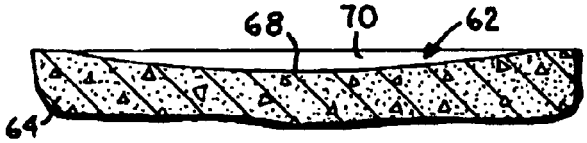
FIG. 6.
FIG. 7.
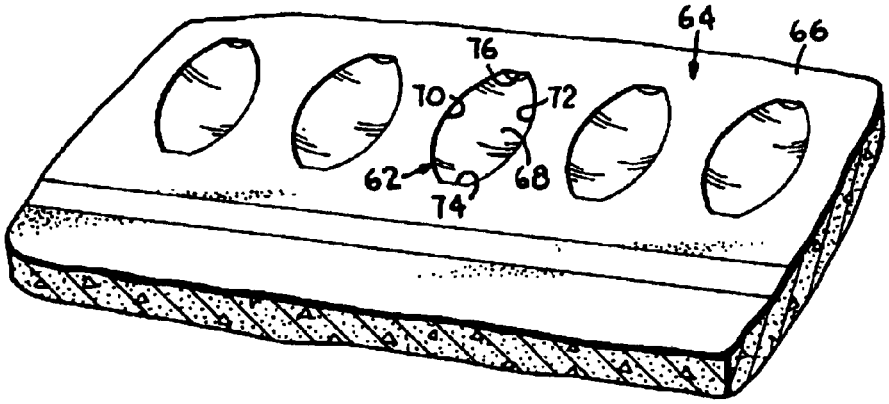

APPARATUS FOR CUTTING RUMBLE STRIPS IN A ROAD SURFACE

Matter enclosed in heavy brackets [ ] appears in the original patent but forms no part of this reissue specification; matter printed in italics indicates the additions made by reissue.

CROSS-REFERENCE TO RELATED APPLICATIONS

This application claims priority from provisional application Ser. No. 60/333,897 filed Nov. 28, 2001 and is a continuation-in-part of application Ser. No. 09/783,418 filed Feb. 14, 2001 now U.S. Pat. No. 6,454,490.

BACKGROUND OF THE INVENTION

The present invention relates generally to road safety devices and, more particularly, to rumble strips and methods and apparatus for forming same.

Depressions, commonly referred to as rumble strips or sonic nap alert patterns (SNAPS), are formed in the surfaces of roads to alert drivers when their vehicles have drifted out of the travel lane of the road or when the vehicle is approaching a dangerous portion of road, such as a stop sign or toll booth. Rumble strip depressions are typically either uniformly spaced apart or are placed in spaced apart groupings in what is known as a skip pattern. Although there is no uniform standard for rumble strips, many highway departments require a five inch separation between adjacent depressions, with each depression having dimensions of seven inches by sixteen inches and a minimum depth of one-half inch. The long dimension of each depression normally extends perpendicular to the longitudinal axis of the road.

Rumble strip depressions are conventionally formed in various fashions, including by using a roller drum to impress the depressions into asphalt roads, using forms to shape wet concrete, or milling or cold planing the depressions in either asphalt or concrete roads. Using roller drums to form the rumble strips is desirable because the depressions are quickly and easily formed by simply rolling the drum over the road surface. Roller drums, however, can only be used on asphaltic roads, and the impressed depressions may tend to rebound over a period of time, thereby reducing the effectiveness of the rumble strips. Using forms to shape the depressions is of limited applicability because the forms can only be used with wet concrete. Milling of rumble strips is more versatile because the depressions can be formed in asphalt as well as hardened concrete.

Various types of milling machines are currently used to cut rumble strip depressions. These machines typically utilize a cylindrical cutting head that is formed by ganging together a plurality of circular diamond saw blades or by attaching tungsten-carbide-cutting elements to a drum. The cutting head is rotated about an axis parallel to the road surface and is repeatedly raised and lowered to cut spaced apart rumble strip depressions as the milling machine travels down the road in a continuous or step-wise fashion. The resulting depressions are typically rectangular in configuration, with curved forward and rearward walls and vertically extending lateral walls. The distance between the forward and rearward walls is variable and is determined by the length of time that the cutting head remains in contact with the road surface. The spacing between the lateral walls is fixed and corresponds to the axial length of the cutting head.

The vertically extending lateral walls in conventional rumble strip depressions can cause several problems. First, when a vehicle drifts off the travel lanes and onto a rumble strip positioned on the road shoulder, the vertical lateral walls cause the tires to suddenly drop laterally from the road surface into the rumble strip depression. This abrupt movement may pull the vehicle even further onto the shoulder and may momentarily distract the vehicle driver. Once the vehicle tries are within the rumble strip depressions, the vertical lateral walls may cause the driver to overcorrect in an attempt to remove the tires from within the rumble strip depression. These problems may be particularly serious for smaller cars, motorcycles and bicycles that are lighter and have smaller tires.

Another drawback of rumble strip depressions having vertical walls is the sharp 90° corner formed between the bottom of the depression and the vertical walls creates an area of localized stress that can cause cracking of the pavement. This cracking may accelerate degradation of the road and require costly repairs or replacement of the road. Water and other debris may also accumulate in those 90° corners and further contribute to road degradation.

As a result of the foregoing problems, a need has developed for a rumble strip depression that is less likely to interfere with vehicle steering and which does not cause premature failure of the road surface.

BRIEF SUMMARY OF THE INVENTION

In one aspect, the present invention is directed to a cutting head for milling rumble strip depressions in an upper surface of a road. The cutting head includes a drum having opposed ends and a center rotational axis extending between the opposed ends. A plurality of milling elements are mounted on an outer surface of the drum and have cutting surfaces positioned to define a plane curve as the drum is rotated about its center rotational axis. The plane curve has a transverse diameter that varies in dimension along said center rotational axis so that the plane curve approximates at least a portion of an elliptical or other curved configuration. Positioning the cutting surfaces in the plane curve allows the cutting head to be used to mill rumble strip depressions that have a concave bottom that curves upwardly along two perpendicular axes. The milling elements preferably are milling teeth that are removably positioned within holders 24 welded or otherwise secured to the outer surface of the drum. The milling teeth also preferably having cutting tips formed of a material that includes tungsten carbide. The cutting tips are positioned so that they cut in the plane curve by either configuring the drum in the shape of an ellipsoid and using the same sized milling elements across the surface of the drum or by providing a cylindrical shape to the drum and using different sized milling elements to achieve the desired profile. In an alternate embodiment, the drum and milling elements are formed by stacked saw blades with interposed spacers.

In another aspect, the present invention is directed to the resulting rumble strip depressions. In the preferred embodiment, the depressions have only two spaced apart sides and the curved bottom curves upwardly along the first axis to form the two sides. In another embodiment, the bottom curves upwardly along the second axis and connects to two lateral and spaced apart side walls.

The invention also includes a method of milling the rumble strips using the cutting head described above and a milling machine that can otherwise be of a conventional construction.

The rumble strip depressions of the present invention have bottoms that curve along both perpendicular axes, in contrast to conventional rumble strips that curve upwardly along only one axis. The resulting forward and rearward side walls curve in a horizontal plane and, when painted with traffic paint or another light reflective coating, is more readily observable because light from vehicle headlights is reflected in multiple directions. The curved nature of the bottoms of the depressions also reduces the areas of localized stress that can lead to cracking and degradation of the road surface. Vehicle-induced wind currents more easily remove debris entering the rumble strip depressions because there are no sharp corners within the depressions where the debris can be shielded from the wind currents. The rumble strip depressions can also be easier to mill because less road material is removed in the formation of the rumble strip depressions of the present invention.

BRIEF DESCRIPTION OF THE SEVERAL VIEWS OF THE DRAWING

In the accompanying drawings which form part of the specification and in which like reference numerals are used to indicate like parts in the various views:

FIG. 1 is a side elevation view of one embodiment of a cutting head of the present invention;

FIG. 2 is a side elevation view of another embodiment of the cutting head of the present invention;

FIG. 5 is a fragmentary top perspective view of a road containing rumble strip depressions cut in accordance with the present invention;

FIG. 6 is a side elevation view of a rumble strip depression taken in vertical section along line 6—6 of FIG. 5;

FIG. 7 is a fragmentary top perspective view of the road containing an alternative embodiment of the rumble strip depressions; and FIG. 8 is a side elevation view of a further embodiment of the cutting head of the present invention.

DETAILED DESCRIPTION OF THE INVENTION

Figure 3:
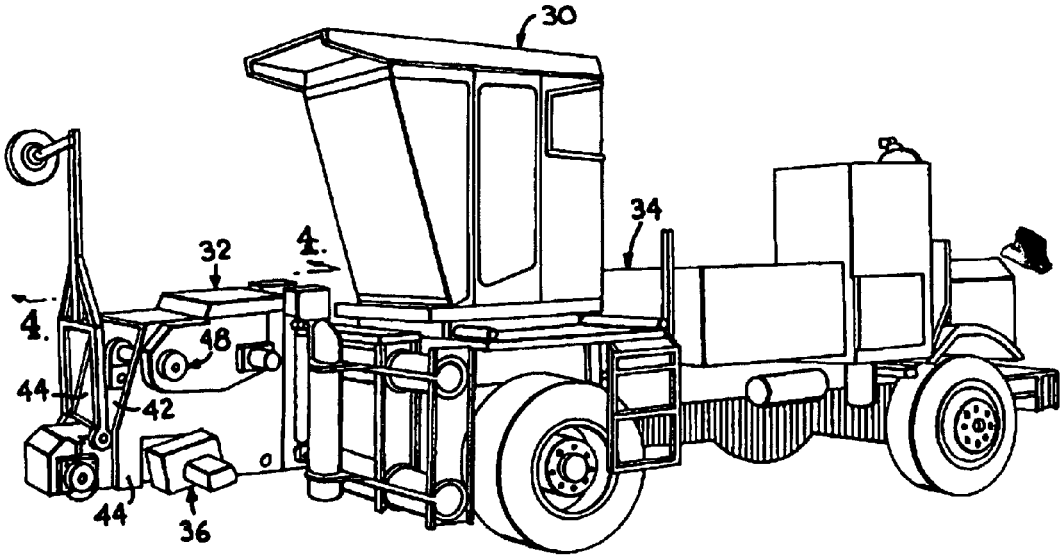
FIG. 3 is a side perspective view of a rumble strip milling machine.

Referring now to the drawings in greater detail, and initially to FIG. 1, a cutting head used to mill rumble strip depressions in accordance with the present invention is represented broadly by the numeral 10. The cutting head 10 is designed to be rotated about a center rotational axis 12 as it is moved up and down to mill away portions of a road surface to form the rumble strip depressions in the road.

The cutting head 10 has a preselected length along its rotational axis 12 and a transverse diameter that varies along the length of the rotational axis 12. As used herein, the transverse diameter is understood to be taken in a plane perpendicular to the rotational axis 12. In the preferred embodiment, the smallest transverse diameter is at opposite ends 14 and 15 of the cutting head 10 and the greatest transverse diameter is midway between the ends 14 and 15. It will be appreciated that the areas of smallest and greatest transverse diameter can be shifted along the axis 12 so long as the areas of smallest transverse diameter are located on opposite sides of the area of greatest transverse diameter. In this manner, an outer cutting surface 16 of the cutting head 10 is outwardly convex and defines a plane curve, such as an ellipsoid, having a major transverse diameter located in a first region and areas of reduced transverse diameter located on one and preferably both sides of the first region. The resulting profile of the cutting surface 16 and the cutting head 10, when viewed from the side, is preferably elliptical with truncated ends, but other outwardly curved configurations such as oval, round and oblong can be selected if desired.

The cutting head 10 is preferably a solid drum 18 to which a plurality of individual milling teeth 20 are removably attached in a spiral, chevron or other pattern that provides the necessary coverage along the drum 18. The milling teeth 20 are also referred to as bullet teeth or tools and normally have cutting tips 22 which form the cutting surface 16 of the cutting head 10. The cutting tips 22 are formed of a durable metal such as tungsten carbide, but can be formed from other materials having a hardness and durability suitable for milling asphalt or concrete. The milling teeth 20 are mounted in blocks or holders 24 that are welded or otherwise secured to an outer surface of the drum 18. Each holder 24 includes a bore 26 that extends through the holder 24 at a preselected angle to the tangent of the outer surface of the drum 18. The bore 26 receives a cylindrical body portion of the milling tooth 20 and positions the milling tooth 20 at the desired angle in relation to the surface to be cut. A lock ring (not shown) or other fastener is used to removably secure the body portion of the milling tooth 20 in the holder 24 so that the milling teeth 20 can be replaced when worn.

The non-cylindrical outer cutting surface 16 of the cutting head 10 is preferably obtained by fashioning the drum 18 in the desired elliptical or other curved configuration and using the same size holders 24 and milling teeth 20 across the outer surface of the drum 18. Alternatively, the non-cylindrical cutting surface 16 can be obtained by using a cylindrical drum 18 and placing different sized holders 24 and/or milling teeth 20 on the drum 18 in a manner so that the cutting tips 22 are positioned in the desired plane curve when the cutting head 10 is rotated about the rotational axis 12.

The outer cutting surface 15 of the cutting head 10 can alternatively be formed by simply placing diamond bits or other abrasives on the outer surface of the drum 18, or by ganging together a plurality of disc-shaped cutting elements, such as diamond saw blades with spacers inserted between adjacent blades. If disc-shaped cutting elements are used, it will be appreciated that cutting elements with differing diameters must be used to obtain the desired elliptical or other curved profile for the cutting head 10.

The ratio of the length of the cutting head 10 to its transverse diameter can be relatively small as illustrated in the cutting head embodiment of FIG. 1 or it can be relatively large as shown in the cutting head embodiment of FIG. 2.

As is best shown in FIG. 1, the cutting head 10 includes a pair of stub shafts 28 that are suitably secured to the drum 18 at the opposite ends 14 and 15 of the cutting head along the center rotational axis 12. The stub shafts 28 allow the cutting head 10 to be mounted for rotation on any suitable milling machine, including those conventionally used for milling rumble strips in road surfaces. The type of milling machine used is not of particular relevance to the present invention so long as it is capable of rotating the cutting head 10 while moving it up and down and along the road surface.

Figure 4:
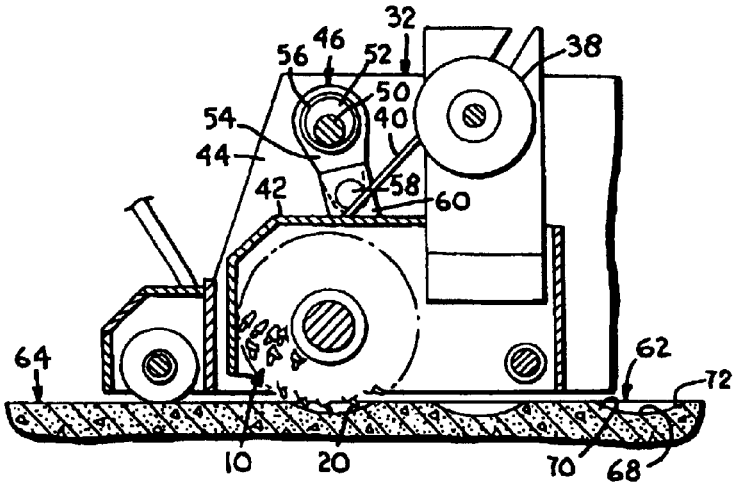
FIG. 4 is a side elevation view of a portion of the rumble strip milling machine taken in vertical section along line 4—4 of FIG. 3 and with portions broken away to illustrate details of construction.

Turning to FIGS. 3 and 4, a preferred milling machine of the type disclosed in U.S. Pat. No. 6,454,490 is designated broadly by the numeral 30 and includes a rumble strip milling attachment 32 mounted forwardly of a vehicle 34. The attachment 32 includes a hydraulic motor 36 that directly drives the stub shafts 28 of the cutting head 10 to effect rotation thereof. A flywheel 38 is connected to one of the stub shafts 28 by one or more belts 40 and functions to store kinetic energy which is then used to smooth out variations in rotational velocity of the cutting head 10 resulting from load variations in the milling operation. The cutting head 10 is housed within a cutter box 42 that is spaced inwardly from lateral outer walls 44 of the attachment 32. The cutting head 10 and box 42 are movable in an up and down direction by a crankshaft 46 that is driven by another hydraulic motor 48. The crankshaft 46 is spaced above the box 42 and rotates within bearings (not shown) carried by the outer walls 44. The crankshaft 46 includes a shaft 50 having a pair of spaced apart eccentric lobes 52. A pair of spaced apart crank arms 54 are mounted on the lobes 52 by bearings 56 that allow shaft 50 to rotate within one end of the crank arms 54. The other ends of the crank arms 54 are pivotally connected at pivot point 58 to brackets 60 that are fixed to and extend upwardly from the cutter box 42. In this manner, it can be seen that rotation of the crankshaft 46 causes the crank arms 54 to move alternately up and down while pivoting about pivot points 58. This movement of the crank arms 54 in turn causes the cutter box 42 to move up and down. The crankshaft 46 thus exerts an alternating up and down force on the cutter box 52 that causes up and down movement of the cutter box 42 and cutting head 10. Notably, the positive downward pressure advantage exerted by the crankshaft 46 on the cutting head 10 causes the cutting head 10 to cut into the road surface more quickly than would be possible relying solely on gravitational forces. Up and down movement of the cutting head 10 can be obtained through other means known in the art, such as cam wheels that contact the road surface or cams that lift the cutting head upwardly, with gravity exerting the downward force to move the cutting head in the downward direction. It can be seen that hydraulic lines and other components have been omitted from FIGS. 3–4 in order to simplify and provide greater clarity in the illustrations. Further details of construction of the milling machine 30 can be obtained from U.S. Pat. No. 6,454,490.

Turning now Co FIGS. 5 and 6, the elliptical or other curved profile of the cutting head 10 allows complementary shaped rumble strip depressions 62 to be milled into a top surface of a road 64 by rotating the cutting head 10 about rotational axis 12 as it is lowered into the road. The cutting head 10 preferably rotates in a reverse direction in relation to the travel direction of the milling machine 30 so that the cutting action resists the forward motion of the milling machine 30. Alternatively, the opposite or forward rotational direction may be used, 4 such as when milling a softer road material such as asphalt. The rotating cutting head 10 is preferably raised and lowered in a uniform, alternating motion as the milling machine 30 is moved along the road 64. It will be appreciated that the up and down movement of the cutting head 10 can be controlled so that it stops for a preselected period of time at one or more positions and can also move more rapidly during selected segments of its travel cycle. The forward movement of the milling machine 30 may also be slowed or stopped during portions of the milling process. In order to achieve a faster production rate, the milling machine 30 will normally be moved in an uninterrupted fashion in the direction of the longitudinal length of the road 64.

The rumble strip depressions 62 can be formed along any desired portion of the road 64. For example, the rumble strip depressions 62 can be formed along one or both shoulders 66 of the road 64 to provide a warning to vehicle drivers that they have drifted out of the normal travel lanes of the road 64. Alternatively, the rumble strip depressions 62 can be positioned along the centerline or dividing line between travel lanes of the road 64 to provide a audible warning when the vehicle is drifting from one travel lane to another. As yet another example, the rumble strip depression 62 can be positioned across one or more travel lanes to warn of an upcoming intersection, toll booth or hazardous stretch of road 64.

The rumble strip depressions 62 can be arranged in various desired patterns, such as being uniformly spaced apart or grouped together in a skip pattern. The long dimension of the depression 62 will normally be perpendicular to the longitudinal direction of the road 64, but can alternatively be parallel to the longitudinal road direction or can extend at an angle thereto. In one embodiment, each rumble strip depression 62 has a length of sixteen inches along the long axis, a dimension of seven inches along the short axis and a depth of one-half to five-eighths inch at the center of the depression. Other dimensions are possible and are within the scope of the invention.

Each rumble strip depression 62 has a concave bottom 68 that is curved along both the long and short axes, and transitions along one of the axes, normally the short axis, into forward and rearward side walls 70 and 72. If the cutting head 10 cuts deeply enough into the road 64, the depressions 62 will also have optional lateral side walls 74 and 76 that transition into the bottom 68 along the other axis, normally the long axis as shown in FIG. 7. Because the bottom 68 of the depressions 62 curves upwardly along both the long and short axes, the vertical walls and ninety degree corners found in conventional rumble strip depressions are eliminated or minimized. As a result, the depressions 62 allow for gradual lateral entry of vehicle tires into the depressions 62 without the type of abrupt movement that can cause driver distraction. As the vehicle drifts into the rumble strip depressions 20, the noise generated by contact of the tires against the forward side wall 70 gradually increases because the depth of each depression 20 increases as the tires move toward the lateral center of the depression 62. This variation in rumble effect can help the driver understand that the noise and vibration are caused by road conditions rather than a flat tire that would be more likely to produce a constant response. In addition, the curved nature of the bottom 68 along the long axis of the depression 62 allows the vehicle tires to be easily removed laterally from the depressions 62 without the tendency to over-correct, as can be the case with conventional rumble strips where the vehicle tires must scale the lateral vertical walls in order to be removed from the rumble strip depression.

The curved nature of the bottom 68 along both the long and short axes and the absence or minimization of ninety degree corners eliminates or reduces the areas of localized stress that can lead to cracking and degradation of the road 64. In addition, water or other debris that enter the rumble strip depressions 62 is funneled to a low point in the center of the depressions where it is exposed to vehicle induced wind currents that can expel the debris from the depression 62. In this manner, the debris is unlikely to remain in the depressions 62 for extended periods of time where it can contribute to premature degradation of the road 64.

Notably, controlling the depth to which the cutting head 10 is lowered into the road 64 can vary the size of each depression 62 along both the long and short axes. This allows the dimensions of a particular series of rumble strip depressions 62 to be gradually increased or decreased by simply increasing or decreasing the depth to which the cutting head 10 cuts into the road 64. The size of the depression 62 along the short axis or between the forward and rearward side walls 70 and 72 can also be varied by increasing or decreasing the amount of time that the cutting head 10 remains in contact with the road 64 as the milling machine 30 moves along the road 64. The amount of time that the cutting head 10 contacts the road 64 can be varied by increasing or decreasing the rate of up and down movement of the cutting head 10, as well as the rate of forward movement of the milling machine 30.

The rumble strip depressions 62 may also be painted with a reflective coating to provide a visual indication of their location. For example, when positioned along the center of the road 64, the depression 62 may be coated with the normal centerline markings formed from traffic paint containing crushed glass reflective beads. Because the forward walls 70 of the depressions 62 curve in both the vertical and horizontal directions, light from vehicle headlights is reflected in multiple directions and is more readily observed by an approaching driver.

In an alternate embodiment illustrated in FIG. 8, side-by-side rumble strip depressions 62 can be formed by a single cutting head 110 having two areas of larger transverse diameter, each of which has areas of reduced transverse diameter on opposite sides thereof. Depending upon the shape of the cutting head 110 and the depth of cut into the road surface, the side-by-side depressions 62 can be spaced apart or interconnected. It will be appreciated that the side-by-side depressions 62 can also be formed by positioning separate cutting heads 10 end-to-end and providing means for independent operation thereof.

As used herein, the term "road" includes the travel lanes of the road, as well as the shoulders that extend along the travel lanes and are intended to be used to accommodate stopped vehicles for emergency use. The use of the terms "long axis" and "short axis" in describing the dimensions of the depressions 62 is not meant to exclude the possibility that the perpendicular axes will be of equal length. This is contemplated by and within the scope of the present invention.

From the foregoing, it will be seen that this invention is one well adapted to attain all the ends and objectives hereinabove set forth together with other advantages which are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A rumble strip milling machine comprising:

a vehicle movable along a road surface;

a cutting head rotatably mounted in associated with said vehicle and mounted for alternating up and down movement *into and out of said road surface while said cutting head is rotating*, said cutting head comprising:

a drum having opposed ends and a center rotational axis extending between said opposed ends, said drum having a convex outer surface in a direction along said center rotational axis;

a shaft extending from said opposed ends of said drum along said center rotational axis; and a plurality of milling elements positioned on said outer surface of the drum and having cutting surfaces positioned to define a plane curve as said drum is rotated about said center rotational axis, said plane curve having a transverse diameter taken in a plane transverse to said center rotational axis, said transverse diameter of the plane curve being greatest in a first region and of reduced dimension in regions on opposite sides of said first region; and a motor coupled with said shaft of the cutting head for effecting rotation thereof.

2. The milling machine of claim 1, *wherein* a vertical plane taken through said plane curve along said center rotational axis has at least a partially elliptical, oval, or round configuration.

3. The milling machine of claim 1, wherein said drum and milling elements comprises a plurality of stacked, disc-shaped saw blades with interposed spacers.

4. The milling machine of claim 1, wherein said drum is ellipsoidal in configuration.

5. The milling machine of claim 4, wherein said milling elements comprise milling teeth mounted to the outer surface of said drum.

6. The milling machine of claim 5, wherein said milling teeth are removably mounted within holders secured to said outer surface of the drum.

7. The milling machine of claim 6, wherein said milling teeth include cutting tips formed of a material comprising tungsten carbide.

8. A rumble strip milling machine comprising:

a vehicle movable along a road surface;

a cutting head rotatably mounted in associated with said vehicle and mounted for alternating up and down movement *into and out of said road surface while said cutting head is rotating*, said cutting head comprising:

a drum having opposed ends and a center rotational axis extending between said opposed ends, said drum having an outer surface;

a shaft extending from said opposed ends of said drum along said center rotational axis; and a plurality of milling elements positioned on said outer surface of the drum and having [culling] *cutting* surfaces positioned to define a plane curve as said drum is rotated about said center rotational axis, said plane curve having a transverse diameter taken in a plane transverse to said center rotational axis, said transverse diameter of the plane curve being greatest in a first region and of reduced dimension in regions on opposite sides of said first region, wherein a vertical plane taken through said plane curve along said center rotational axis has at least a partially elliptical, oval, or round configuration; and a motor coupled with said shaft of the cutting head for effecting rotation thereof.

9. The milling machine of claim 8, wherein said drum and milling elements comprises a plurality of stacked, disc-shaped saw blades with interposed spacers.

10. The milling machine of claim 9, wherein said milling elements comprise milling teeth mounted to the outer surface of said drum.

11. The milling machine of claim 10, wherein said milling teeth are removably mounted within holders secured to said outer surface of the drum.

12. The milling machine of claim 11, wherein said milling teeth include cutting [rips] *tips* formed of a material comprising tungsten carbide.

13. A rumble strip milling machine comprising:

a vehicle movable along a road surface;

a cutting head rotatably mounted in associated with said vehicle and mounted for alternating up and down movement *into and out of said road surface while said cutting head is rotating*, said cutting head comprising:

a drum having opposed ends and a center rotational axis extending between said opposed ends, said drum having an outer surface which is ellipsoidal in configuration;

a shaft extending from said opposed ends of said drum along said center rotational axis; and a plurality of milling elements positioned on said outer surface of the drum and having cutting surfaces positioned to define a plane curve as said drum is rotated about said center rotational axis; and a motor coupled with said shaft of the cutting head for effecting rotation thereof.

14. The milling machine of claim 13, wherein said drum and milling elements comprises a plurality of stacked, disc-shaped saw blades with interposed spacers.

15. The milling machine of claim 13, wherein said milling elements comprise milling teeth mounted to the outer surface of said drum.

16. The milling machine of claim 15, wherein said milling teeth are removably mounted within holders secured to said Outer surface of the drum.

17. The milling machine of claim 16, wherein said milling teeth include cutting tips formed of a material comprising tungsten carbide.

*18. The milling machine of claim 1, including means for moving said cutting head into said road surface with a positive downward pressure while said cutting head is rotating.*

*19. The milling machine of claim 18, including a crankshaft having a rotatable shaft and coupled with said cutting head to cause said alternating up and down movement of the cutting head as the rotatable shaft is rotated.*

*20. The milling machine of claim 19, wherein said rotatable shaft of the crankshaft is rotatably driven by a second motor.*

*21. The milling machine of claim 20, wherein said crankshaft includes at least one eccentric lobe mounted on said rotatable shaft and a crank arm mounted at one end of the lobe by a bearing, said crank arm being coupled at an opposite end with the cutting head.*

*22. The milling machine of claim 1, wherein said cutting head is mounted for rotation in a reverse direction in relation to a forward direction of travel of said vehicle along said road surface so that a cutting action of said cutting head into said road surface resists said forward direction of travel of said vehicle.*

*23. The milling machine of claim 1, wherein said vehicle is movable in a forward direction of travel along said road surface while said cutting head is rotating and moving up and down into and out of said road surface.*

*24. The milling machine of claim 1, wherein said plane curve includes a second region spaced from said first region and having a transverse diameter greater than said reduced dimension in said regions on opposite sides of said first region.*

*25. The milling machine of claim 24, wherein said transverse diameter of said plane curve in said second region is the same as said transverse diameter of the plane curve in the said first region.*

*26. The milling machine of claim 1, used in a method to mill spaced apart rumble strip depressions into said upper surface of the road, comprising the steps of (a) rotating said cutting head at a preselected rotational speed about a center rotational axis, (b) moving said rotating cutting head downwardly a preselected distance into said road surface to mill a depression having a concave bottom that curves upwardly along perpendicular first and second axes, (c) moving said cutting head in an upward direction and advancing the milling machine along the road surface, and (d) repeating steps (b) and (c) to form a plurality of said depressions in spaced apart relationship along said road surface.*

*27. The milling machine of claim 26, including the step of removing the cutting head from the road surface before advancing the milling machine along the road surface.*

*28. The milling machine of claim 26, including advancing the milling machine along the road surface during said steps of moving said rotating cutting head down into the road surface and moving said cutting head in an upward direction.*

*29. The milling machine of claim 26, including varying the preselected distance said rotating cutting head is moved down into said surface as said steps (b) and (c) are repeated.*

*30. The milling machine of claim 1, wherein said cutting head is rotated at a preselected rotational speed about said center rotational axis.*

*31. The milling machine of claim 2, wherein said cutting head is moved into a road surface a preselected distance so as to mill a depression.*

*32. The milling machine of claim 31, wherein the depression has a concave bottom that curves upwardly along perpendicular first and second axes.*

*33. The milling machine of claim 32, wherein upon forming the depression, said cutting head is moved in an upward direction away from the road surface.*

*34. The milling machine of claim 33, wherein said milling machine is advanced along the road surface so as to locate the machine in spaced positions for forming a plurality of said depressions in spaced apart relationship.*

*35. The milling machine of claim 34, wherein said cutting head is moved in a downward direction upon advancement of the milling machine along the road surface.*

*36. The milling machine of claim 35, including means for moving said cutting head into said road surface with a positive downward pressure while said cutting head is rotating.*

*37. The milling machine of claim 13, including means for moving said cutting head into said road surface with a positive downward pressure while said cutting head is rotating.*

*38. The milling machine of claim 1, wherein said cutting head is housed within a cutter box that extends in a forward direction beyond said cutting head.*

*39. The milling machine of claim 38, including means for moving said cutting head into said road surface with a positive downward pressure while said cutting head is rotating, wherein said means comprises a crankshaft having a rotatable shaft and coupled with said cutting head to cause said alternating up and down movement of the cutting head as the rotatable shaft is rotated, said crankshaft further including at least one eccentric lobe mounted on said rotatable shaft and a crank arm mounted at one end of the lobe by a bearing, said crank arm being coupled at an opposite end with the cutter box.*

* * * * *